United States Patent [19]

Jung

[11] Patent Number: 6,061,401
[45] Date of Patent: May 9, 2000

[54] METHOD AND APPARATUS FOR SELECTIVELY ENCODING/DECODING A VIDEO SIGNAL

[75] Inventor: Hae-Mook Jung, Seoul, Rep. of Korea

[73] Assignee: Daewoo Electronics Co., Ltd., Rep. of Korea

[21] Appl. No.: 08/985,662

[22] Filed: Dec. 9, 1997

Related U.S. Application Data

[63] Continuation-in-part of application No. 08/436,951, May 8, 1995.

[30] Foreign Application Priority Data

Mar. 20, 1995 [KR] Rep. of Korea ......................... 955866

[51] Int. Cl.$^7$ ................. H04N 7/30; H04N 7/50
[52] U.S. Cl. ................. 375/240; 348/401; 348/415; 348/416; 348/420; 348/421; 348/422
[58] Field of Search .................................. 348/699, 384, 348/390, 398–403, 405, 407, 409–413, 415, 416, 420–422; 382/232, 236, 238, 248, 250, 251; H04N 7/30, 7/50

[56] References Cited

U.S. PATENT DOCUMENTS

| | | | |
|---|---|---|---|
| 4,837,618 | 6/1989 | Hatori ...................................... | 348/401 |
| 4,855,825 | 8/1989 | Santamaki et al. ...................... | 348/415 |
| 5,200,820 | 4/1993 | Gharvi ..................................... | 348/416 |
| 5,351,086 | 9/1994 | Park ........................................ | 348/402 |
| 5,392,073 | 2/1995 | Jeong ...................................... | 348/413 |
| 5,453,801 | 9/1995 | Kim ........................................ | 348/699 |
| 5,486,863 | 1/1996 | Auyeung ................................. | 348/420 |
| 5,506,624 | 4/1996 | Moreton ................................. | 348/420 |

FOREIGN PATENT DOCUMENTS 0346635 12/1989 European Pat. Off. .
0346637 12/1989 European Pat. Off. .

OTHER PUBLICATIONS

Brofferio s et al., "Computation Bounded Video Coding" Signal Processing of HDTV, L'Aquila, Feb. 29–Mar. 2, 1998, No. Workshop 2, pp. 199–205.

Primary Examiner—Howard Britton
Attorney, Agent, or Firm—Anderson Kill & Olick, P.C.

[57] ABSTRACT

A method and apparatus processes a video signal by selectively encoding and decoding a plurality of blocks included in the video signal. The encoding apparatus selects a plurality of processing blocks from a motion compensated error signal and decides position data of the processing blocks, wherein error values contained in the processing blocks are larger than the remaining error values and each of the position data of the processing blocks denotes a left top pixel position of each of the processing blocks. Then the apparatus transforms the processing blocks to a plurality of sets of transform coefficients and converts the plurality of sets of transform coefficients into a plurality of sets of quantized transform coefficients. The plurality of sets of quantized transform coefficients are combined with the position data of the processing blocks in order to provide an encoded signal.

15 Claims, 6 Drawing Sheets

METHOD AND APPARATUS FOR SELECTIVELY ENCODING/DECODING A VIDEO SIGNAL

CROSS REFERENCE TO RELATED APPLICATION

This application is a continuation-in-part of U.S. Ser. No. 08/436,951 filed on May 8, 1995.

FIELD OF THE INVENTION

The present invention relates to a method and apparatus for processing a video signal; and, more particularly, to a coding method and apparatus capable of reducing the transmission rate of the video signal by selectively encoding same and to a decoding method and apparatus corresponding thereto.

DESCRIPTION OF THE PRIOR ART

As is well known, transmission of digitized video signals can deliver video images of much higher quality than the transmission of analog signals. When a video signal comprising a sequence of image "frames" is expressed in a digital form, a substantial amount of data is generated for transmission, especially in the case of the high definition television system. Since, however, the available frequency bandwidth of a conventional transmission channel is limited, in order to transmit the substantial amount of digital data through the limited channel bandwidth, it is inevitable to compress or reduce the volume of the transmission data. Among various video compression techniques, the so-called hybrid coding technique, which combines a temporal and a spatial compression techniques together with a statistical coding technique, is known to be most effective.

Most hybrid coding techniques employ the motion compensated DPCM(differential pulse code modulation), two-dimensional DCT(discrete cosine transform), quantization of DCT coefficients, and VLC(variable length coding).

The motion compensated DPCM is a process of determining the movement of an object between a current frame and its previous frame, and predicting the current frame according to the motion flow of the object to produce a difference or an error signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12, pp.1291–1302 (December 1985); and in Ninomiya and Ohtsuka, "A Motion-Compensated Interframe Coding Scheme for Television Pictures", *IEEE Transactions on Communications*, COM-30, No. 1, pp.201–211 (January 1982).

Specifically, in the motion compensated DPCM, current frame data is predicted from the corresponding previous frame data based on an estimation of the motion between the current and the previous frames. Such estimated motion may be described in terms of two dimensional motion vectors representing the displacements of pixels between the previous and the current frames.

There have been two basic approaches to estimate the displacement of pixels of an object. One is a block-by-block estimation and the other is a pixel-by-pixel approach.

In the block-by-block motion estimation, each block in a current frame is compared with the blocks in its previous frame until a best match is determined. From this, an interframe displacement vector (which indicates how much the block of pixels has moved between the frames) for the whole block in the current frame can be estimated.

The two-dimensional DCT which reduces or removes spatial redundancies between image data converts a block of digital image data, for example, a block of 8×8 pixels, into a set of transform coefficient data. This technique is described in Chen and Pratt, "Scene Adaptive Coder", *IEEE Transactions on Communications*, COM-32, No. 3, pp.225–232 (March 1984). By processing such transform coefficient data with a quantizer, zigzag scanning, and VLC, the amount of data to be transmitted can be effectively compressed.

When applying the hybrid coding techniques to a low bit rate video signal codec system having , e.g., 64 Kb/s transmission channel bandwidth, however, it is virtually impossible to transmit all the encoded video signal data due to the limited channel capacity.

SUMMARY OF THE INVENTION

It is, therefore, a primary object of the present invention to provide an improved method and apparatus for encoding a video signal by selectively processing a plurality of blocks included in the video signal, thereby reducing the transmission rate of the encoded video signal.

In accordance with one aspect of the present invention, there is provided a method, for use in a video signal encoder, for converting an error signal into an encoded signal wherein the error signal represents P×Q number of motion compensated differential pixel values between a current frame and a previous frame of a video signal, P and Q being positive integers larger than 2, respectively, comprising the steps of: (a) providing a plurality of error blocks from the error signal, each of the error blocks including M×N motion compensated differential pixel values and being overlapped with one or more neighboring error blocks, M and N being positive integers larger than 1, respectively; (b) ciphering a mean value for each of the error blocks based on the P×Q number of motion compensated differential pixel values in the error signal; (c) comparing the mean values of the error blocks with one another to select a predetermined number of error blocks in a descending order of the mean values starting from a largest one and providing position data representing positions of selected error blocks, wherein the selected error blocks are not overlapped with one another; (d) transforming the M×N motion compensated differential pixel values included in each of the selected error blocks to a set of transform coefficients; (e) converting the set of transform coefficients into a set of quantized transform coefficients; and (f) combining the sets of quantized transform coefficients and the position data of the selected error blocks, to thereby provide the encoded signal.

In accordance with another aspect of the present invention, there is provided an apparatus, for use in a video signal encoder, for converting an error signal into an encoded signal wherein the error signal represents P×Q number of motion compensated differential pixel values between a current frame and a previous frame of a video signal, P and Q being positive integers larger than 2, respectively, comprising: a block formation unit for providing a plurality of error blocks from the error signal, each of the error blocks including M×N motion compensated differential pixel values and being overlapped with one or more neighboring error blocks, M and N being positive integers larger than 1, respectively; a mean calculation unit for computing a mean value for each of the error blocks based on the P×Q number of motion compensated differential pixel values in the error signal; a selection unit for comparing the mean values of the error blocks with one another to select a predetermined number of error blocks in a descending order of the mean values starting from a largest one and providing position data representing positions of selected error blocks, wherein the selected error blocks are not overlapped with one another; a transformation unit for transforming the M×N motion compensated differential pixel values included in each of the selected error blocks to a set of transform coefficients; a quantization unit for converting the set of transform coefficients into a set of quantized transform coefficients; an encoding unit for combining the sets of quantized transform coefficients and the position data of the selected error blocks, to thereby provide the encoded signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
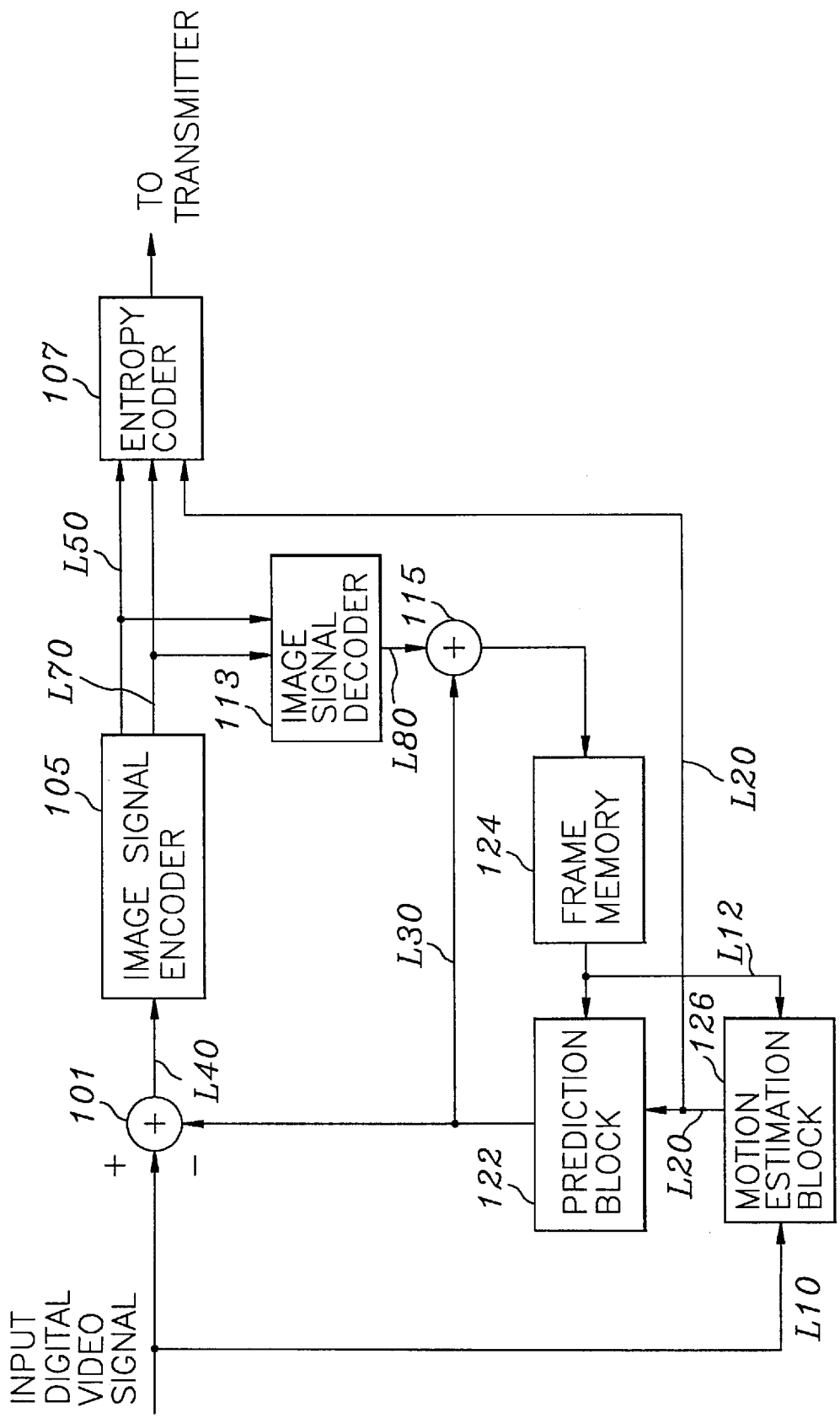
FIG. 1 is a block diagram of a video signal encoder in accordance with the present invention.

Referring to FIG. 1, there is shown a block diagram of a video signal encoder comprising an image signal encoder of the present invention.

An input digital video signal of a current frame is fed to a motion estimation block 126 via a line L10 and a subtractor 101. At the motion estimation block 126, the current frame signal on the line L10 and a reconstructed previous frame signal on a line L12 from a frame memory 124 are processed to estimate a set of motion vectors by employing the conventional block-by-block estimation method, each of the motion vectors representing a displacement between a search block of the current frame and its best matching block included in a corresponding search region of the previous frame.

The motion vectors on a line L20 provided from the motion estimation block 126 are applied to a prediction block 122 and an entropy coder 107. In response to the motion vectors, a predicted current frame signal is generated at the prediction block 122 on a block-by-block basis by retrieving pixel data corresponding to the motion vectors from the frame memory 124. The predicted current frame signal is provided to the subtractor 101 and an adder 115 via a line L30.

The predicted current frame signal from the prediction block 122 is subtracted from the current frame signal at the subtractor 101; and the resultant data, i.e., an error signal denoting differential pixel values or error values between the current frame and the predicted current frame, is dispatched via a line L40 to an image signal encoder 105 of the present invention.

At the image signal encoder 105, the error signal is processed, in accordance with the present invention, to detect a plurality of processing blocks based on the error values of pixels included therein. Then, the processing blocks detected are processed by using the DCT and quantization to provide a plurality of sets of quantized transform coefficients. Outputs from the image signal encoder 105 serve to provide the position data of the processing blocks on a line L70 and the sets of quantized transform coefficients on a line L50. Details of the image signal encoder 105 will be described hereinafter with reference to FIGS. 2 to 4.

The quantized transform coefficients and the position data of the processing blocks are transmitted via two signal paths: one that leads to the entropy coder 107, wherein the sets of quantized transform coefficients and the position data of the processing blocks are coded together with the motion vectors supplied through the line L20 by using, for example, a combination of run-length and variable length coding techniques and the coded results are provided to a transmitter (not shown) for the transmission thereof; and the other to an image signal decoder 113, wherein the sets of the quantized transform coefficients are converted into a reconstructed error signal. Details of the image signal decoder 113 will be described with reference to FIG. 5.

The reconstructed error signal on a line L80 from the image signal decoder 113 and the predicted current frame signal from the prediction block 122 are added together at the adder 115 to provide a reconstructed current frame signal to be written onto the frame memory 124.

Reconstruction of the error signal is required in order for the encoder to monitor the behavior of the decoder in a receiver.

Figure 2:
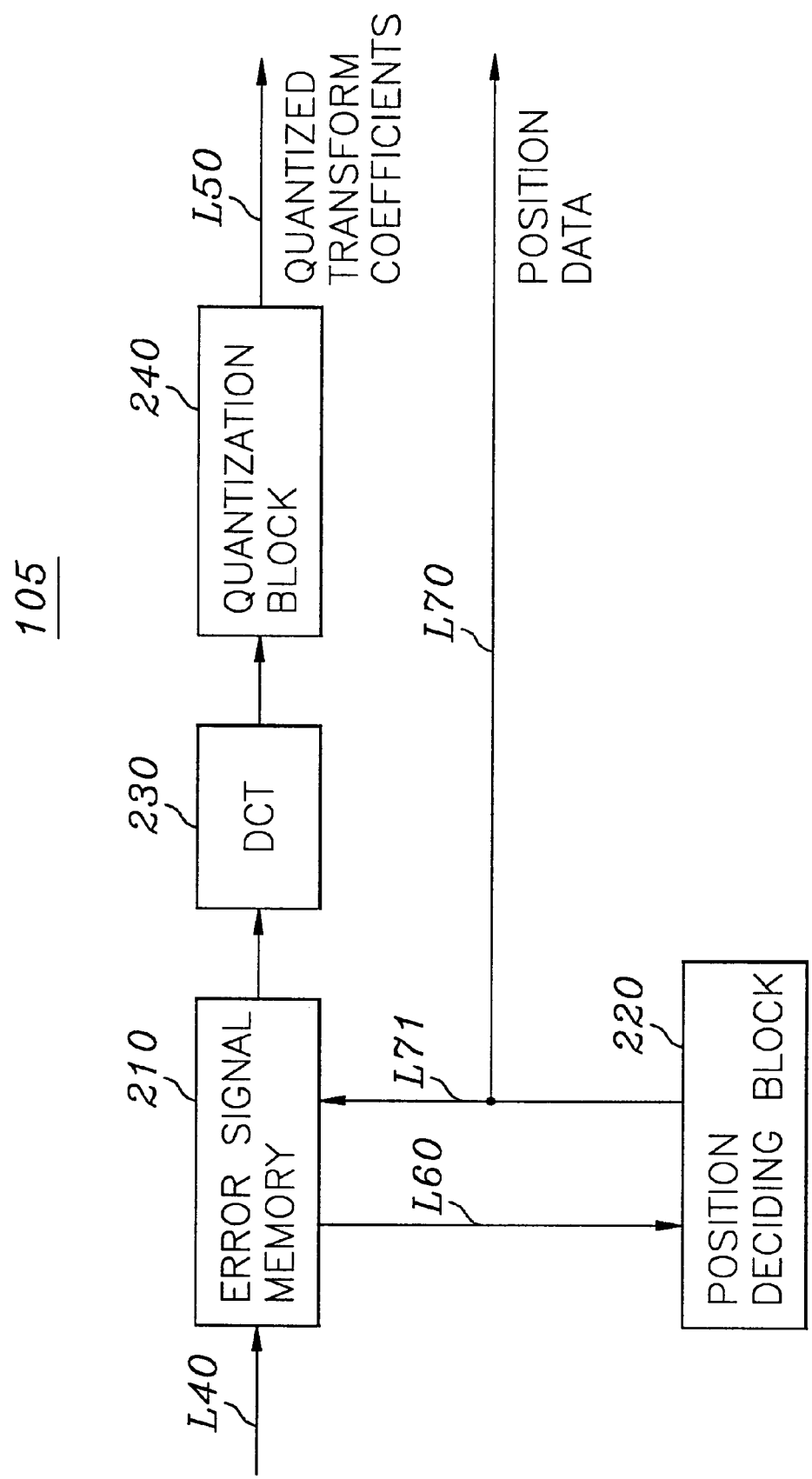
FIG. 2 depicts a detailed block diagram of the image signal encoder shown in FIG. 1.

Referring to FIG. 2, there is provided a detailed block diagram of the image signal encoder 105 shown in FIG. 1. The error signal on the line L40 provided from the subtractor 101 is stored in an error signal memory 210. The error signal stored in the error signal memory 210 is fed to a position deciding block 220 through a line L60. The position deciding block 220 determines the plurality of processing blocks from the error signal based on the error values of the pixels and provides the position data of the processing blocks to the error signal memory 210. Details of the position deciding block 220 will be described with reference to FIG. 3.

The position data of the processing blocks from the position deciding block 220 are coupled to the error signal memory 210 through a line L71 and to the entropy coder 107 and the image signal decoder 113 shown in FIG. 1 through the line L70. In response to the position data of the processing blocks, the error signal memory 210 provides a set of error values for each of the processing blocks to a DCT block 230. The set of error values for each of the processing blocks is processed in the DCT block 230 to provide a set of transform coefficients to a quantization block 240. The set of transform coefficients are then quantized in the quantization block 240 to provide a set of the quantized transform coefficients on the line L50 to the entropy coder 107 and the image signal decoder 113 shown in FIG. 1.

Figure 3:
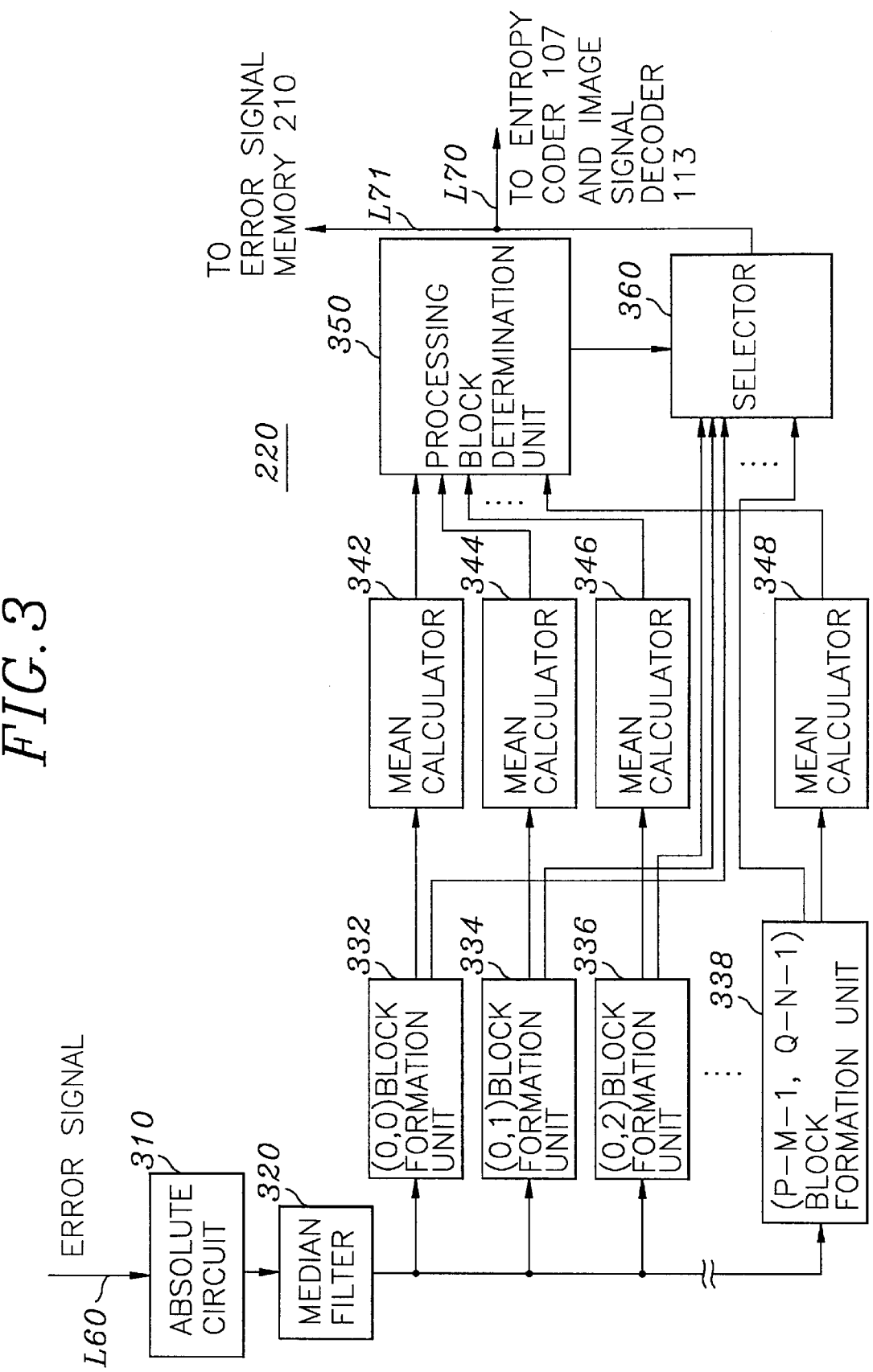
FIG. 3 provides a detailed block diagram of the position deciding block shown in FIG. 2.

Referring to FIG. 3, there is presented a detailed block diagram of the position deciding block 220 shown in FIG. 2. The error signal from the error signal memory 210 shown in FIG. 2 is applied to an absolute circuit 310. The absolute circuit 310 converts each error value included in the error signal into its absolute value. The absolute error values of the error signal from the absolute circuit 310 are filtered by using a conventional median-filtering method at a median filter 320 on a pixel-by-pixel basis. Specifically, at the median filter 320, the input pixel is replaced by a median of pixels contained in a window around the pixel. The filtered error values are inputted to a K number of (i,j) block formation units, e.g., 332, 334, 336, and 338 shown in FIG. 3.

Figure 4:
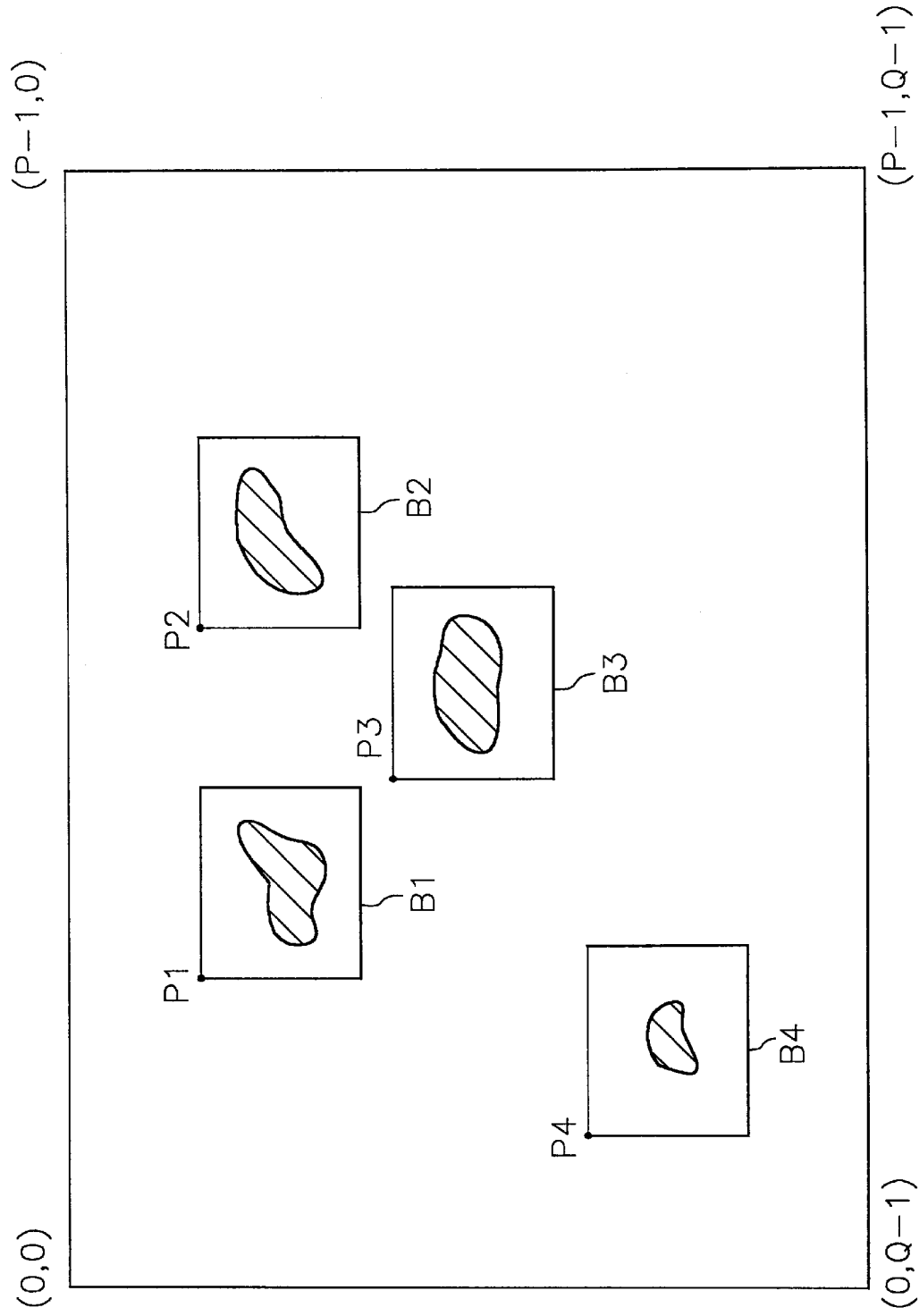
FIG. 4 illustrates a method employed in selecting the processing blocks at the position deciding block.

Referring to FIG. 4, there is illustrated a frame of the filtered error values of, e.g., P×Q pixels, P and Q being positive integers larger than 2, wherein the numerals in respective parentheses denote x and y coordinates of four corner pixels of the frame. Each of the (i,j) block formation units generates an (i,j) error block of M×N, e.g., 8×8, pixels from the frame, M and N being positive integers larger than 1, respectively, wherein i and j represent the x and y coordinates of a left top corner pixel of the error block, respectively.

Referring back to FIG. 3 which shows, e.g., a (P−M+1)× (Q−N+1) number of block formation units, only 4 units are explicitly depicted for the sake of simplicity. A first block formation unit, i.e., the (0,0) block formation unit 332, provides a set of filtered error values for an error block located at (0,0) in the frame. Similarly, a second block formation unit, e.g., the (0,1) block formation unit 334, and a Kth block formation unit, e.g., the (P−M−1,Q−N−1) block formation unit 338, provide sets of filtered error values for the error blocks positioned at (0,1) and (P−M−1,Q−N−1), respectively. That is, in the above process, it can be seen that the error blocks derived from the (i,j) block formation units are determined by shifting a block formation window of M×N pixels by, e.g., one pixel along the frame starting from one of four corners of the frame and, thereafter, each of the error blocks is overlapped with one or more neighboring error blocks.

The block formation units 332 to 338 provide respective position data of the error blocks and sets of filtered error values to a selector 360 and corresponding mean calculators 342, 344, 346 and 348, respectively. Each of the mean calculators 342 to 348 provides a processing block determination unit 350 with a mean value for each error block by averaging the filtered error values included therein. At the processing block determination unit 350, the mean values are compared with each other to select a predetermined number of, e.g., 4, non-overlapping error blocks in a descending order of their mean values starting from a largest one. For instance, if an error block B3 shown in FIG. 4 has a largest mean value among all of the error blocks, the error block B3 is selected first. Subsequently, an error block, e.g., B1, having a largest mean value among the remaining error blocks which do not overlap the previously selected error block, i.e., B3, is selected next. In the above case, if the error block B1 is overlapped with the previously selected error block B3, it is not selected. This procedure is repeated until all the predetermined number of non-overlapping error blocks, e.g., B1, B2, B3 and B4, are selected. These selected error blocks are determined as the processing blocks to be processed at the DCT block 230 shown in FIG. 2. Once each of the processing blocks is detected, the processing block determination unit 350 generates a selection signal which represents the processing block. Even though the number of processing blocks is predetermined in accordance with the preferred embodiment of the invention, it should be apparent to those skilled in the art that it can be adjusted according to the buffer occupancy, i.e., the amount of data in an output buffer(not shown).

The selector 360, in response to the selection signal from the processing block determination unit 350, determines the positions of the processing blocks based on the position data of the error blocks transmitted from the block formation units 332 to 338; and provides them as the position data of the processing blocks to the error signal memory 210 shown in FIG. 2 via the line L71 and to the entropy coder 107 and the image signal decoder 113 shown in FIG. 1 via the line L70. For example, if blocks B1 to B4 shown in FIG. 4 are selected as the processing blocks, the left top pixel positions thereof, e.g., P1 to P4, become the position data of the processing blocks.

Figure 5:
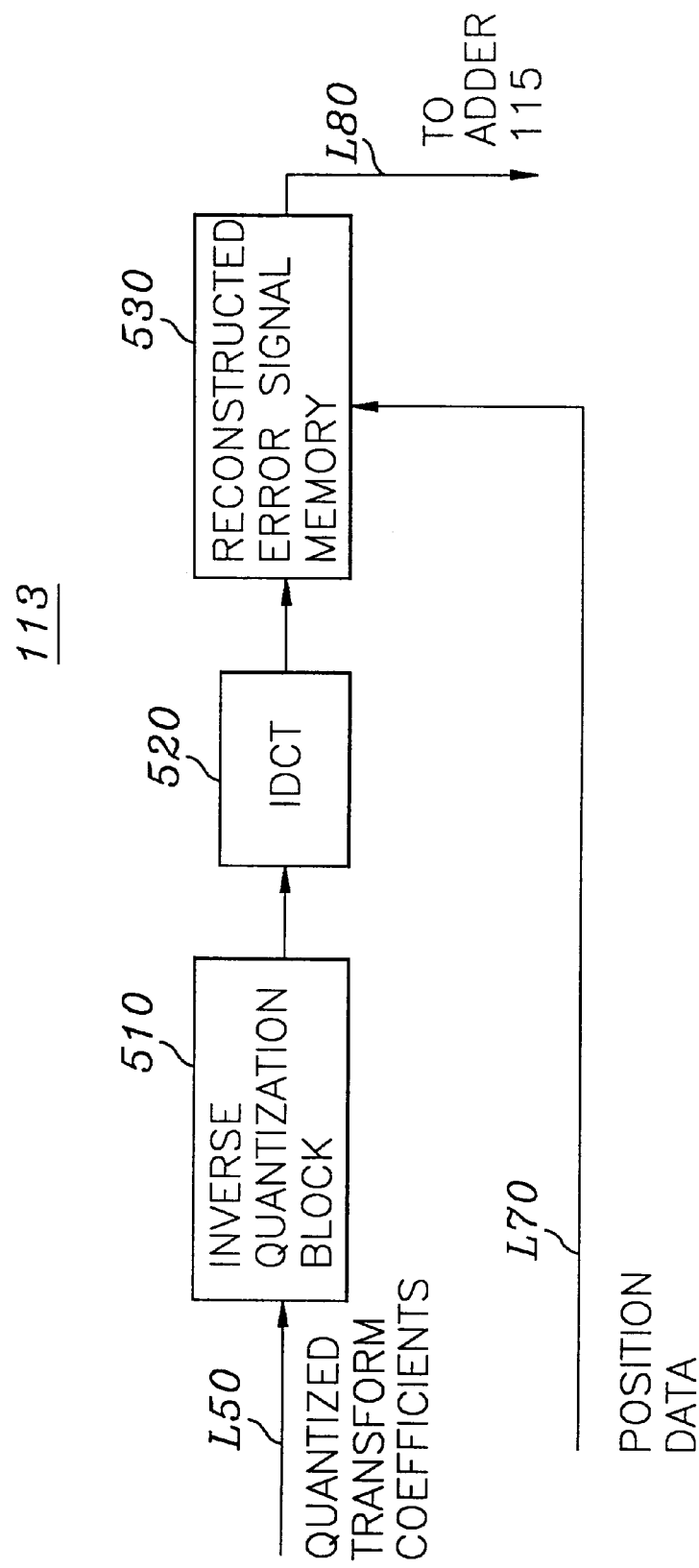
FIG. 5 represents a detailed block diagram of the image signal decoder shown in FIG. 1.

Referring to FIG. 5, there is provided a detailed block diagram of the image signal decoder 113 shown in FIG. 1. The quantized transform coefficients from the image signal encoder 105 shown in FIG. 1 are fed to an inverse quantization block 510, wherein the quantized transform coefficients on the line L50 are converted into reconstructed transform coefficients. The reconstructed transform coefficients are provided to an IDCT(inverse DCT) block 520 to obtain reconstructed error values. The reconstructed error values are fed to a reconstructed error signal memory 530 wherein a plurality of sets of the reconstructed error values are stored in positions given by the position data of the processing blocks provided through the line L70. The remainder of the reconstructed error signal memory 530 is set to 0 to provide a reconstructed error signal to the adder 115 shown in FIG. 1 through the line L80.

Figure 6:
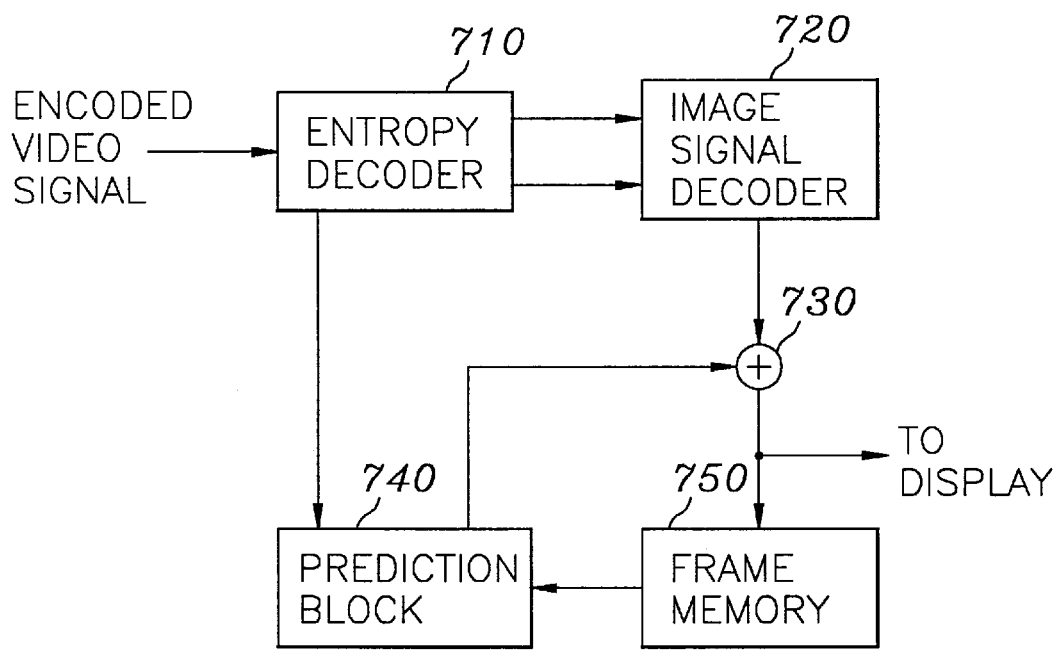
FIG. 6 shows a block diagram of a video signal decoder in accordance with the present invention.

Referring to FIG. 6, there is illustrated a block diagram of a video signal decoder including an image signal decoder 720, an adder 730, a prediction block 740 and a frame memory 750, which are identical to the image signal decoder 113, the adder 115, the prediction block 122 and the frame memory 124 of the video signal encoder shown in FIG. 1, respectively.

The encoded video signal transmitted from the video signal encoder shown in FIG. 1 is fed to an entropy decoder 710 of the video signal decoder. Then, the entropy decoder 710 decodes the encoded video signal to provide the motion vectors to the prediction block 740, and the position data of the processing blocks and the quantized transform coefficients to the image signal decoder 720. At the image signal decoder 720, the position data of the processing blocks and the quantized transform coefficients are processed in a same manner as in the image signal decoder 113 of the video signal encoder, thereby providing the reconstructed error signal to the adder 730. In the meanwhile, the prediction block 740 provides the adder 730 with the predicted current frame signal by retrieving the pixel data from the frame memory 750 in response to the motion vectors. The predicted current frame signal and the reconstructed error signal are added together at the adder 730 to provide the reconstructed current frame signal to a display unit(not shown) and the frame memory 750.

Using the method explained above, a plurality of processing blocks having larger errors are selected from error blocks in the error signal to thereby provide a low bit rate encoded video signal. The bit rate of the encoded signal can be easily altered by changing the number of processing blocks in a frame.

While the present invention has been described with respect to the particular embodiments, it will be apparent to those skilled in the art that various changes and modifications may be made without departing from the spirit and scope of the invention as defined in the following claims.

What is claimed is:

1. A method, for use in a video signal encoder, for converting an error signal into an encoded signal wherein the error signal represents P×Q number of motion compensated differential pixel values between a current frame and a previous frame of a video signal, P and Q being positive integers larger than 2, respectively, comprising the steps of:

(a) providing a plurality of error blocks from the error signal, each of the error blocks including M×N motion compensated differential pixel values and being overlapped with one or more neighboring error blocks, M and N being positive integers larger than 1, respectively;

(b) ciphering a mean value for each of the error blocks based on the P×Q number of motion compensated differential pixel values in the error signal;

(c) comparing the mean values of the error blocks with one another to select a predetermined number of error blocks in a descending order of the mean values starting from a largest one and providing position data representing positions of selected error blocks, wherein the selected error blocks are not overlapped with one another;

(d) transforming the M×N motion compensated differential pixel values included in each of the selected error blocks to a set of transform coefficients;

(e) converting the set of transform coefficients into a set of quantized transform coefficients; and (f) combining the sets of quantized transform coefficients and the position data of the selected error blocks, to thereby provide the encoded signal.

2. The method as recited in claim 1, wherein, in the step (b), the mean value of an error block is determined by averaging the M×N motion compensated differential pixel values contained in the error block.

3. The method as recited in claim 2, wherein, in the step (a), (P−M+1)×(Q−N+1) number of error blocks are determined from the error signal through the use of a block formation window of M×N pixels shifting by one pixel along the error signal.

4. The method as recited in claim 1, wherein the step (b) includes the steps of:

(b1) converting each of the P×Q number of motion compensated differential pixel values in the error signal into an absolute value;

(b2) filtering the absolute values of the error signal by using a median-filtering method on a pixel-by-pixel basis; and (b3) calculating the mean value for each of the error blocks by averaging the absolute values corresponding to said each of the error blocks.

5. The method as recited in claim 4, wherein, in the step (a), (P−M+1)×(Q−N+1) number of error blocks are determined from the error signal through the use of a block formation window of M×N pixels shifting by one pixel along the error signal.

6. The method as recited in claim 5, wherein the position data of the selected error block denotes a left top pixel position of the selected error block.

7. The method as recited in claim 6, wherein the number of error blocks to be selected can be adjusted according to an amount of transmission data.

8. An apparatus, for use in a video signal encoder, for converting an error signal into an encoded signal wherein the error signal represents P×Q number of motion compensated differential pixel values between a current frame and a previous frame of a video signal, P and Q being positive integers larger than 2, respectively, comprising:

means for providing a plurality of error blocks from the error signal, each of the error blocks including M×N motion compensated differential pixel values and being overlapped with one or more neighboring error blocks, M and N being positive integers larger than 1, respectively;

means for calculating a mean value for each of the error blocks based on the P×Q number of motion compensated differential pixel values in the error signal;

means for comparing the mean values of the error blocks with one another to select a predetermined number of error blocks in a descending order of the mean values starting from a largest one and providing position data representing positions of selected error blocks, wherein the selected error blocks are not overlapped with one another;

means for transforming the M×N motion compensated differential pixel values included in each of the selected error blocks to a set of transform coefficients;

means for converting the set of transform coefficients into a set of quantized transform coefficients; and means for combining the sets of quantized transform coefficients and the position data of the selected error blocks, to thereby provide the encoded signal.

9. The apparatus according to claim 8, wherein the mean value of an error block is determined by averaging the M×N motion compensated differential pixel values contained in the error block.

10. The apparatus according to claim 9, wherein the providing means supplies (P−M+1)×(Q−N+1) number of error blocks determined from the error signal through the use of a block formation window of M×N pixels shifting by one pixel along the error signal.

11. The apparatus according to claim 8, wherein the mean value calculating means includes:

means for converting each of the P×Q number of motion compensated differential pixel values in the error signal into an absolute value;

means for filtering the absolute values of the error signal by using a median-filtering method on a pixel-by-pixel basis; and means for computing the mean value for each of the error blocks by averaging the absolute values corresponding to said each of the error blocks.

12. The apparatus according to claim 11, wherein the providing means supplies (P−M+1)×(Q−N+1) number of error blocks determined from the error signal through the use of a block formation window of M×N pixels shifting by one pixel along the error signal.

13. The method as recited in claim 10, wherein the position data of the selected error block denotes a left top pixel position of the selected error block.

14. A video signal encoder for encoding a video signal, the video signal having a current frame signal and a previous frame signal, which comprises:

prediction means for generating a set of motion vectors, each motion vector representing a displacement between a search block of the current frame signal and its best matching block included in a corresponding search region of a reconstructed previous frame, and for generating a predicted current frame signal based on the set of motion vectors and the reconstructed previous frame signal;

means for generating an error signal representing a difference between the current frame signal and the predicted current frame signal, wherein the error signal denotes P×Q number of differential pixel values, P and Q being positive integers larger than 2, respectively;

means for providing a plurality of error blocks from the error signal, each of the error blocks including M×N motion compensated differential pixel values and being overlapped with one or more neighboring error blocks, M and N being positive integers larger than 1, respectively;

means for calculating a mean value for each of the error blocks based on the P×Q number of motion compensated differential pixel values in the error signal;

means for comparing the mean values of the error blocks with one another to select a predetermined number of error blocks in a descending order of the mean values starting from a largest one and providing position data representing positions of selected error blocks, wherein the selected error blocks are not overlapped with one another;

means for transforming the M×N motion compensated differential pixel values included in each of the selected error blocks to a set of transform coefficients;

means for converting the set of transform coefficients into a set of quantized transform coefficients; and means for combining the sets of quantized transform coefficients, the position data of the selected error blocks and the set of motion vectors, to thereby provide the encoded signal.

15. The video signal encoder as recited in claim 14, wherein the prediction means includes:

means for converting each set of the quantized transform coefficients included in the encoded previous frame signal into a set of reconstructed transform coefficients;

means for inverse transforming the set of reconstructed transform coefficients to a set of reconstructed M×N differential pixel values;

means for providing a reconstructed error signal in response to the position data of the selected error blocks, wherein the reconstructed error signal has a set of reconstructed M×N motion compensated differential pixel values at a corresponding selected error block position and zero values at non-selected error block positions; and means for combining the reconstructed error signal and the predicted current signal to generate the reconstructed previous frame signal.

* * * * *